United States Patent
Chen et al.

(10) Patent No.: US 12,429,381 B2
(45) Date of Patent: Sep. 30, 2025

(54) METHOD FOR SEAMLESSLY SPLICING BASED ON THREE LENSES AND AREA ARRAY DETECTORS

(71) Applicant: Shanghai Institute of Technical Physics Chinese Academy of Sciences, Shanghai (CN)

(72) Inventors: Fansheng Chen, Shanghai (CN); Peishan Song, Shanghai (CN); Zhuoyue Hu, Shanghai (CN); Liyuan Li, Shanghai (CN)

(73) Assignee: Shanghai Institute of Technical Physics Chinese Academy of Sciences, Shanghai (CN)

( * ) Notice: Subject to any disclaimer, the term of this patent is extended or adjusted under 35 U.S.C. 154(b) by 344 days.

(21) Appl. No.: 18/171,173

(22) Filed: Feb. 17, 2023

(65) Prior Publication Data

US 2023/0266171 A1     Aug. 24, 2023

(30) Foreign Application Priority Data

Feb. 18, 2022 (CN) .......................... 202210153000.X (51) Int. Cl.
| | |
|---|---|
| *G01T 5/10* | (2006.01) |
| *G01J 5/0806* | (2022.01) |
| *G01J 5/10* | (2006.01) |
| *G01J 5/00* | (2022.01) |

(52) U.S. Cl.
CPC .............. *G01J 5/10* (2013.01); *G01J 5/0806* (2013.01); *G01J 2005/0077* (2013.01); *G01J 2005/106* (2013.01)

(58) Field of Classification Search
None
See application file for complete search history.

(56) References Cited

FOREIGN PATENT DOCUMENTS

| | | | |
|---|---|---|---|
| CN | 102905061 A | * | 1/2013 |
| CN | 104301590 A | | 1/2015 |
| CN | 104320565 A | * | 1/2015 |
| CN | 106546997 A | | 3/2017 |
| CN | 106813781 B | | 6/2019 |
| CN | 113514150 A | | 10/2021 |

OTHER PUBLICATIONS

Office Action issued in Chinese Application No. 202210153000.X, mailed on Jun. 10, 2023 (7 pages).

* cited by examiner

*Primary Examiner* — Marcus H Taningco
(74) *Attorney, Agent, or Firm* — OSHA BERGMAN WATANABE & BURTON LLP (57) ABSTRACT

A seamlessly splicing method based on three lenses and area array detectors, includes: imaging a field of view simultaneously using the three lenses; arranging three area array detectors at corresponding focal plane positions of each of the three lenses to obtain imaging images, respectively; and generating a complete seamlessly imaging result of the field of view by pairwise splicing the imaging images obtained from adjacent area array detectors, through staggered splicing of the three lens and/or the area array detectors.

6 Claims, 6 Drawing Sheets

METHOD FOR SEAMLESSLY SPLICING BASED ON THREE LENSES AND AREA ARRAY DETECTORS

TECHNICAL FIELD

The invention relates to the technical field of aerospace infrared photoelectric remote sensing detection, and more specifically, relates to a seamlessly splicing method based on three lenses and area array detectors.

BACKGROUND TECHNIQUE

The infrared large area array detection system is of great significance to the improvement of infrared detection and astronomical wide-area survey capabilities, and it is the development direction of the infrared detection system.

At present, the splicing methods of large area array infrared detectors are mainly divided into the following two types:

One is the mechanical splicing of multiple detectors.

For example, Chinese Patent No. CN113514150A proposes a modular three-dimensional adjustable detector splicing structure, including a detector module, a module substrate, a mounting substrate, a cold chain, a flexible cable, a connector, a connecting rod, and an adjustment gasket. The splicing structure contains two or more detector modules, which are installed on the module substrate, and connecting rods at the bottom are provided with height adjustment gaskets for adjusting the flatness of the detector module array. The inner diameter of the mounting hole on the mounting base plate is slightly larger than the outer diameter of the connecting rod, which is used to adjust the horizontal installation accuracy of the detector. The electrical signal of the detector module is extracted through the flexible cold chain, and Joule heat is exported through the cold chain. In the above-mentioned mechanical splicing method, a single detector module is independent and highly replaceable, but it cannot reduce the seam caused by the distance from the effective pixel area to the edge of the module.

The other is a splicing method that combines an optical system and an area array detector. For example, Chinese Patent No. CN106813781B proposes a super large area array compound splicing method for infrared detectors. Based on the existing small-scale area array devices, when two detectors have adjacent corners, they overlap one pixel along the horizontal direction of the checkerboard line; The other set is arranged in a checkerboard black grid, and when two detectors have adjacent corners, they overlap by one pixel along the vertical line of the checkerboard line. The result is two complementary and overlapping detector components. Then, using the optical splicing method, two optical paths are separated by a beam splitting prism, and the two detector components are placed on the conjugate image planes of the two optical paths to collect images for the same field of view. Finally, data processing is performed on the two images, and they are filled with each other. The above splicing method uses the method of prism splitting and detector mechanical splicing to realize splicing of large area array detectors, however, the requirements on the optical system are high and there are still blind areas in the image plane after splicing.

INVENTION CONTENT

The purpose of the invention is to provide a seamlessly splicing method based on three lenses and area array detectors, so as to solve the problem of large imaging blind areas in the mechanical splicing method of infrared area array detectors in the existing technology.

Another object of the invention is to provide a seamless splicing method based on three lenses and an area array detector, so as to solve the problem of complex optical system in the optical splicing method of infrared area array detectors in the existing technology.

In order to achieve the above object, the invention provides a seamlessly splicing method based on three lens and area array detectors, comprises the following steps:

Using three optical lenses to image the same field of view simultaneously;

Arranging three area array detectors at the focal plane positions corresponding to the optical lens to generate imaging images respectively;

Through the staggered splicing of optical lens and/or area array detector, the imaging images of adjacent area array detectors are spliced in pairs to generate a complete seamlessly imaging result of the same field of view.

In one embodiment, the splicing of imaging images of adjacent area array detectors in pairs, further comprising:

The row or column pixel elements of the imaging images of the adjacent area array detectors are overlapped according to a certain overlapping amount, and the overlapping amount is not less than one pixel.

In one embodiment, the area array detector is composed of several area array detection units that are arranged in a matrix checkerboard staggered arrangement according to a predetermined spacing, perform the following:

Wherein, the number of area array detection units in each area array detector is m×n;

m is the number of area array detection units in each row;

n is the number of area array detection units in each column.

In one embodiment, the three optical lenses are placed in parallel, and the parallel placement direction is a first direction;

Translate the adjacent area array detectors by a specific distance to realize the overlapping of row or column pixels of the adjacent area array detectors.

In one embodiment, the row direction is the first direction of the area array detector;

In the first direction, the area array detectors' area array detection units are arranged according to the spacing L;

Translate adjacent area array detectors by L−a to achieve two-by-two splicing of imaging image;

Wherein, L is the spacing between adjacent area array detection units in the first direction, and a is the overlap width of adjacent area array detectors in the first direction.

In one embodiment, the area array detection unit is composed of pixels arranged in a matrix, and the total number of pixels is M×N;

M is the number of pixels in each row;

N is the number of pixels in each column.

In one embodiment, an angle is set between adjacent optical lenses in the horizontal direction corresponding to the area array detector;

The imaging images of adjacent area array detectors are spliced in pairs by means of optical lens field of view splicing, so that the row or column pixel elements of adjacent area array detectors can be overlapped.

In one embodiment, the adjacent optical lenses form a dislocation overlapping on the image plane of the corresponding area array detector, and the overlap width is the difference in image height formed by adjacent optical lenses.

In one embodiment, for an optical lens with no rotation angle, the incident angle of parallel light is w, and the image height formed is y, which is given by the following expression: y=f'×tan w, f' is the focal length of the optical lens.

In one embodiment, an angle φ is set for the adjacent optical lenses in the horizontal direction corresponding to the area array detector, and the image height formed by the incident parallel light is y', which is given by the following expression: y'=f'×tan(w−φ).

The seamlessly splicing method based on the three lenses and area array detectors provided by the invention, three optical lenses are used to image the same target. A complete seamlessly image is formed by combining the staggered splicing of three area array detectors. It is a simple optical system, and there is no blind area in the splicing process.

DESCRIPTION OF THE FIGURES

The above and other features, properties and advantages of the invention will become more apparent from the following description in conjunction with the figures and embodiments, in which the same reference numerals represent the same features throughout, wherein.

The meaning of each reference mark in the figure is as follows:
- 110 optical lens;
- 120 optical lens;
- 130 optical lens;
- 210 area array detector;
- 220 area array detector;
- 230 area array detector;
- 240 area array detection unit;
- 300 focal plane.

SPECIFIC IMPLEMENTATION METHODS

In order to make the object, technical solution and advantages of the invention clearer, the invention will be further described in detail below with reference to the attached figures and embodiments. It should be understood that the specific embodiments described here are only used to explain the invention, and are not intended to limit the invention.

Aiming at the technical problems of large imaging blind area of traditional infrared area array detector mechanical splicing and complex optical system during optical splicing. The invention provides a seamlessly splicing method based on the three lenses and area array detectors, which is suitable for a staring detection system with a large field of view, and is especially suitable for a staring infrared detection system with a wide field of view.

Figure 1:
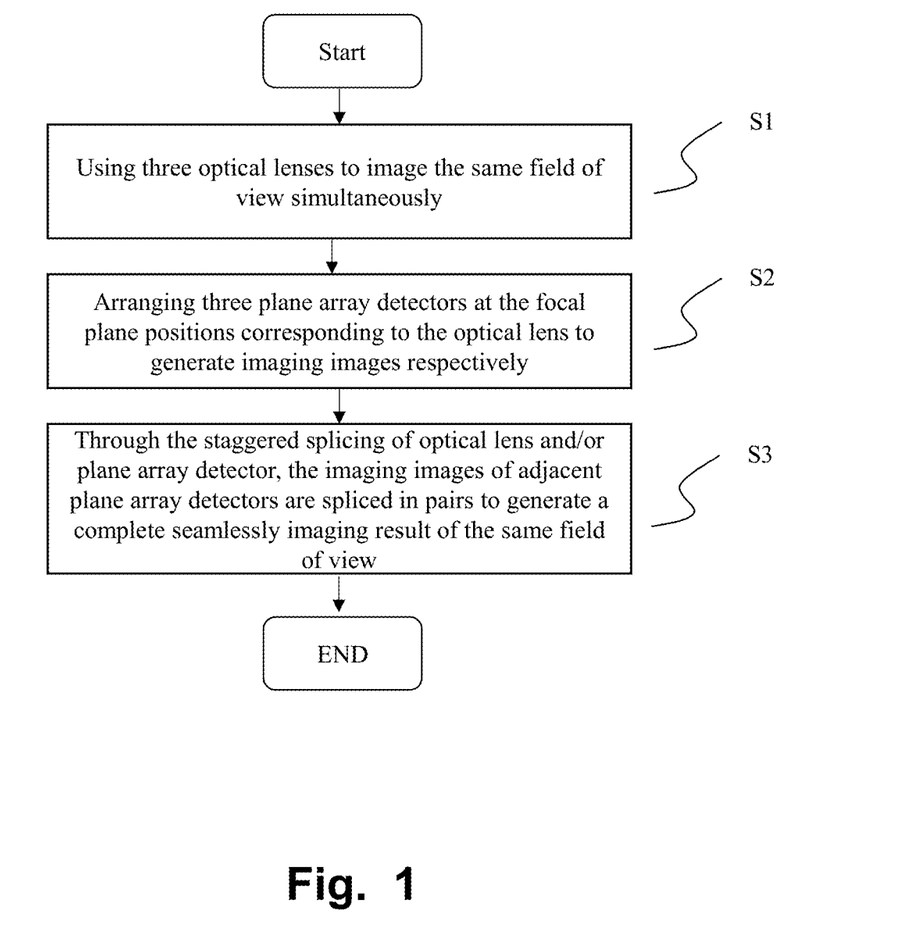
FIG. 1 discloses a flow chart of a seamlessly splicing method based on three lenses and area array detectors according to an embodiment of the invention.

FIG. 1 discloses a flow chart of a seamlessly splicing method based on three lenses and area array detectors according to an embodiment of the invention. As shown in FIG. 1, the seamlessly splicing method based on three lenses and plane area array detectors proposed by the invention, including the following steps:

Step S1, using three optical lenses to image the same field of view simultaneously;

Step S2, arranging three area array detectors at the focal plane positions corresponding to the optical lens to generate imaging images respectively;

Step S3, through the staggered splicing of optical lens and/or area array detector, the imaging images of adjacent area array detectors are spliced in pairs to generate a complete seamlessly imaging result of the same field of view.

Figure 2:
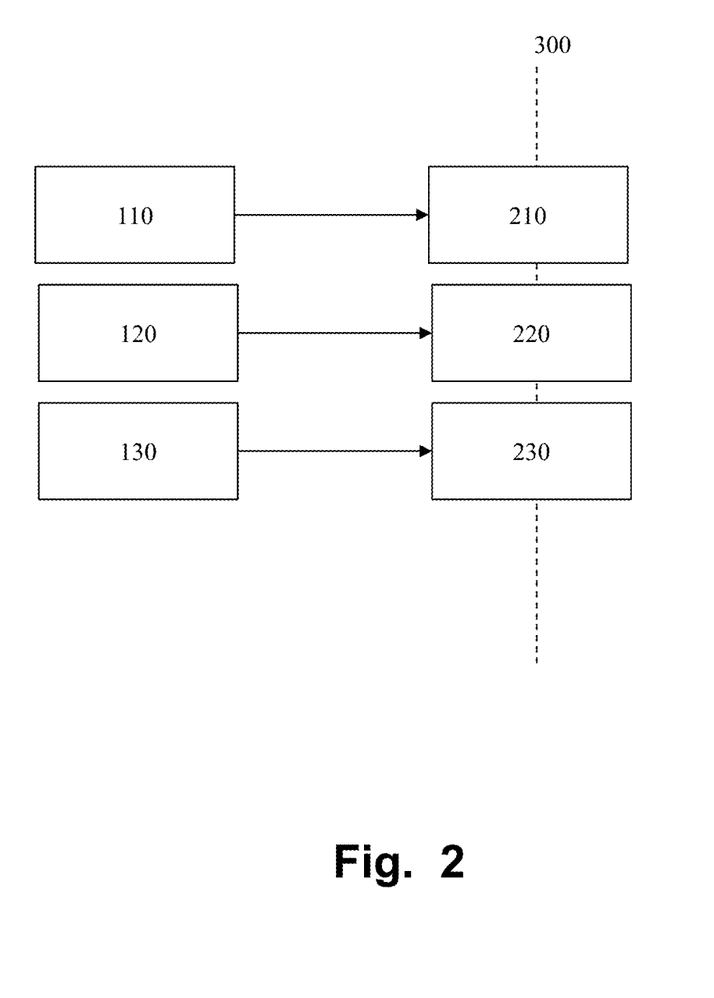
FIG. 2 discloses a schematic diagram of the connection between three lenses and area array detectors according to an embodiment of the invention.

FIG. 2 discloses a schematic diagram of the connection between three lenses and area array detectors according to an embodiment of the invention. As shown in FIG. 2, the three optical lenses include the optical lens 110, the optical lens 120 and the optical lens 130. The corresponding three area array detectors include area array detector 210, area array detector 220, and area array detector 230.

The optical lens 110 is corresponding to the area array detector 210, the optical lens 120 is corresponding to the area array detector 220, and the optical lens 130 is corresponding to the area array detector 230.

The area array detector 210, the area array detector 220, and the area array detector 230 are arranged in different positions on the focal plane 300.

The seamlessly splicing method based on the three lens and area array detectors proposed by the present invention, by simultaneously imaging the target with three optical lenses 110, 120 and 130 with the same field of view. Using three area array detectors 210, area array detector 220, and area array detector 230 arranged at different positions on the focal plane 300, through the staggered splicing of optical lenses and/or area array detectors, the large field of view of large area array cameras can be seamlessly spliced together.

Figure 3:
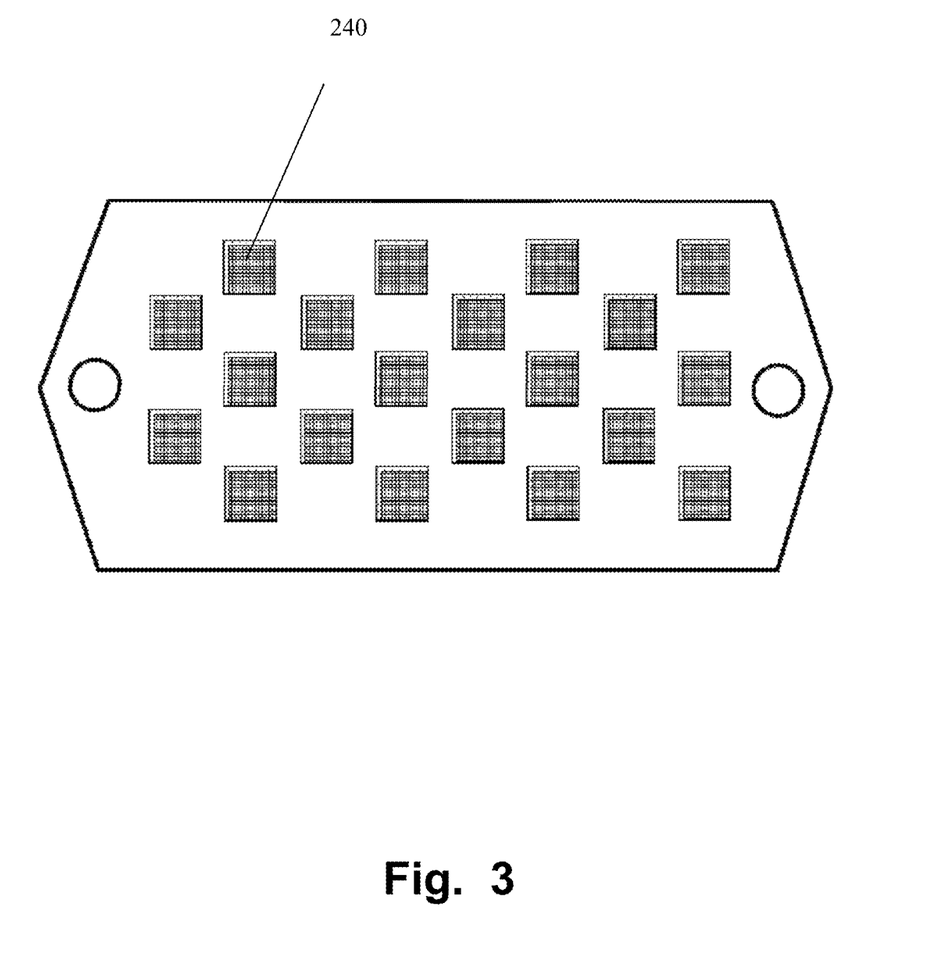
FIG. 3 discloses a schematic structural view of a single area array detector according to an embodiment of the invention.

FIG. 3 discloses a schematic structural view of a single area array detector according to an embodiment of the invention, As shown in FIG. 3, each area array detector is composed of several area array detection units 240, and the area array detection units 240 are arranged in a matrix checkerboard staggered arrangement according to a predetermined spacing.

Wherein, the number of area array detection units in each area array detector is m\times n;

m is the number of area array detection units in each row;

n is the number of area array detection units in each column.

As shown in FIG. 3, since the area array detection units 240 of each area array detector are arranged in staggered arrangement in the row direction and column direction, obviously, when the invention calculates the total number of area array detection units 240, it is necessary to align the row direction with the column direction to calculate the number. That is, in the plane detector shown in FIG. 3, the number of area array detection units 240 in the row direction is four, and the number of area array detection units 240 in the column direction is five. The total number of area array detection units 240 of the area array detector in FIG. 3 is twenty.

The specifications of the area array detection units are the same, they are all composed of pixels arranged in a matrix, and the total number of pixels is M×N;

Wherein, M is the number of pixels in each row;

N is the number of pixels in each column.

Further, in order to ensure the integrity of the field of view, the area array detector 210, the area array detector 220, and the area array detector 230 are spliced in staggered arrangement, the rows or columns of adjacent area array detectors have a certain number of column or row pixels overlapped, and the overlapping amount is not less than one pixel.

Further, in the seamlessly splicing method based on the three lenses and area array detectors proposed by the invention, the rows or columns of the imaging images of the adjacent area array detectors have a certain number of columns or rows of pixels to overlap, which can be achieved in two ways:

1) The three optical lenses are placed in parallel, and the pixels of adjacent area array detectors overlap through the layout spacing of the detectors on the three area array detectors;

2) In the horizontal direction corresponding to the area array detector, a certain angle is set between the adjacent lenses of the three optical lenses, and only through the field of view splicing, the pixels of adjacent area array detectors are overlapped.

The above two implementation manners are respectively described below through Embodiment 1 and Embodiment 2.

Embodiment 1

Take three area array detectors of the same specifications spliced into a large area array detector as an example to illustrate the first overlapping implementation method based on the seamlessly splicing method of three lenses and area array detectors proposed by the invention.

Figure 4:
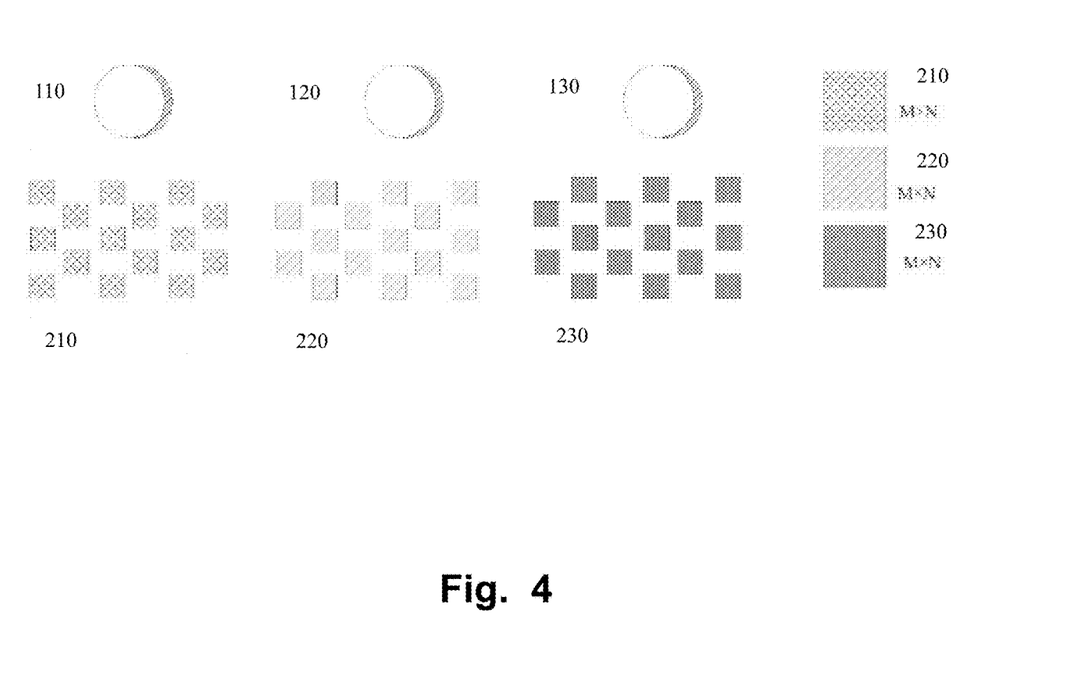
FIG. 4 discloses a schematic diagram of a spliced image of three lenses and area array detector according to an Embodiment 1 of the invention.
Figure 5:
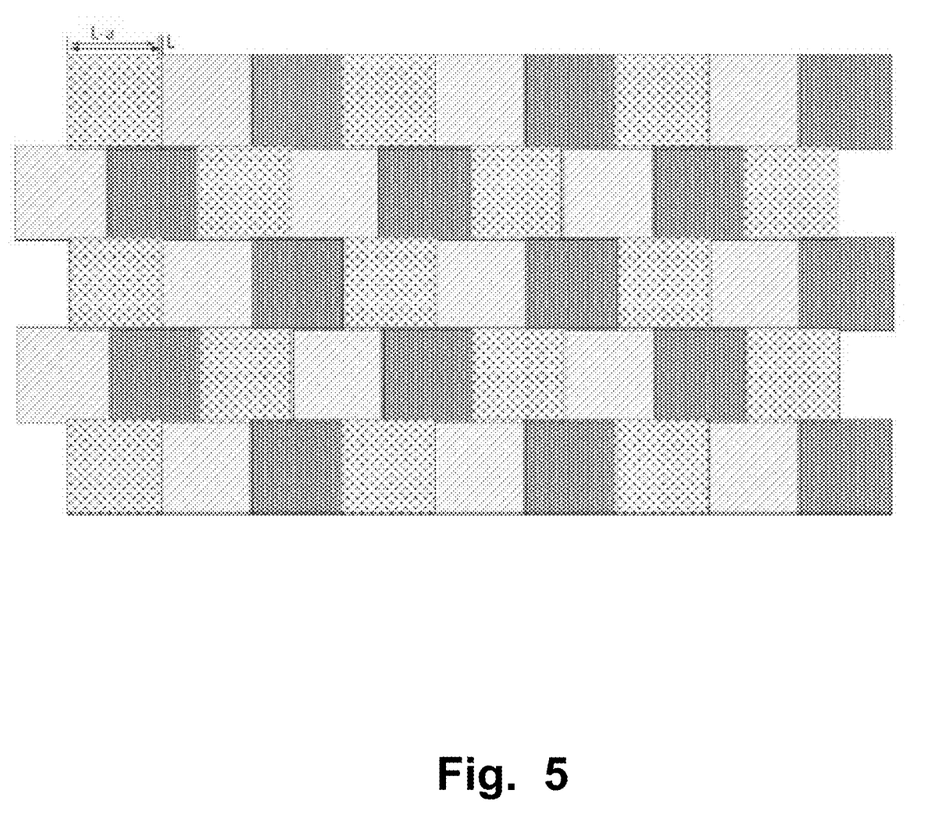
FIG. 5 discloses a schematic diagram of the result of seamlessly splicing based on the three lenses and area array detectors according to Embodiment 1 of the invention FIG. 6A discloses a schematic diagram of imaging without rotation angle of the optical lens according to Embodiment 2 of the invention.

FIG. 4 discloses a schematic diagram of a spliced image of three lenses and area array detector according to an embodiment of the invention, FIG. 5 discloses a schematic diagram of the result of seamlessly splicing based on the three lenses and area array detectors according to an embodiment of the invention. In the Embodiment 1 shown in FIG. 4 and FIG. 5, the specific implementation steps of the seamlessly splicing method based on the three lenses and area array detectors proposed by the invention are as follows:

Three optical lenses 110, optical lens 120 and optical lens 130 are placed in parallel, and three optical lenses 110, optical lens 120 and optical lens 130 are used to simultaneously image the same field of view, wherein the parameters of the three optical lenses of the optical system are the same, with the same field of view;

Three area array detectors 210, the area array detector 220, and the area array detector 230 to be spliced are respectively arranged on the focal plane positions corresponding to the optical lens 110, the optical lens 120, and the optical lens 130. The specifications of the area array detection units of the area array detector 210, the area array detector 220, and the area array detector 230 are all M×N, and the corresponding example patterns are illustrated on the right side of FIG. 4;

Setting the row direction of the area array detector 210, the area array detector 220, and the area array detector 230 as the first direction, that is, the row arrangement direction of the area array detection units of the area array detector is set to the parallel placement direction of the three optical lenses;

Arranging the area array detection units in the first direction according to the spacing L, and the spacing between two adjacent area array detection units is L.

Translating the adjacent area array detectors by a specific distance L−a, realizes overlapping of rows or columns of pixels of adjacent detectors, and then realizes two-by-two splicing of imaging images.

The overlap width of the adjacent area array detectors in the first direction is a.

More specifically, the physical translation of the three area array detectors 210, 220, and 230 is as follows:

Compared with the area array detector 210, the area array detector 220 is translated to the right in the row direction of the focal plane, with a translation distance of (L−a);

Compared with the area array detector 220, the area array detector 230 is translated to the right in the row direction of the focal plane, with a translation distance of (L−a);

Finally, a large area array detector equivalent to (3m× M)×(n×N) is formed.

It should be noted that in the description of the invention, it should be understood that the orientation or positional relationship indicated by the terms "row direction", "column direction", "lengthwise", "landscape", "length", "width", "thickness", "upper", "lower", "front", "backward", "left", "right", "vertical", "horizontal", "top", "bottom", "inner", etc. are based on the orientation or positional relationship shown in the attached figures. It is only for the convenience of describing the invention and simplifies the description, but does not indicate or imply that the referred device or element must have a specific orientation, be constructed and operated in a specific orientation, and thus should not be construed as limiting for the invention.

FIG. 5 discloses a schematic diagram of the result of seamlessly splicing based on three lenses and area array detectors according to an embodiment of the invention. As shown in FIG. 5, the splicing effect of the large area array detector does not exist in the blind area of the field of view, and realizes the seamlessly splicing of staring infrared detection images of the large field of view.

Embodiment 2

Taking three area array detectors with the same specifications spliced into a large area array detector as an example to illustrate the second overlapping implementation method based on the seamlessly splicing method of the three lenses and the area array detector proposed by the invention.

Figure 6A:
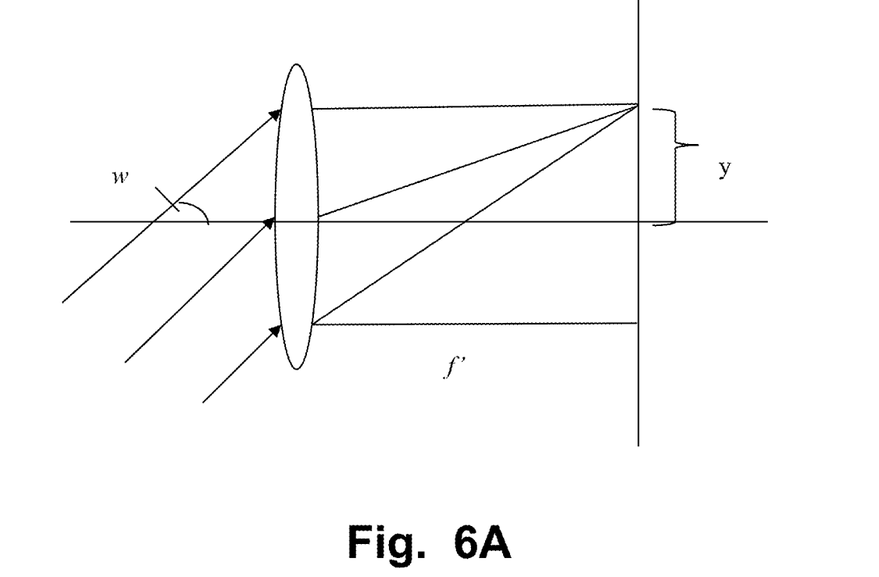

FIG. 6a discloses a schematic diagram of imaging without rotation angle of the optical lens according to Embodiment 2 of the invention. As shown in FIG. 6a, for the same field of view target, the optical lens is equivalent to the incidence of parallel light. For a certain angle w, parallel light is incident, and the formed image height is y. The corresponding expression is as follows:

$$y = f' \times \tan w;$$

Wherein, f' is the focal length of the optical lens.

Figure 6B:
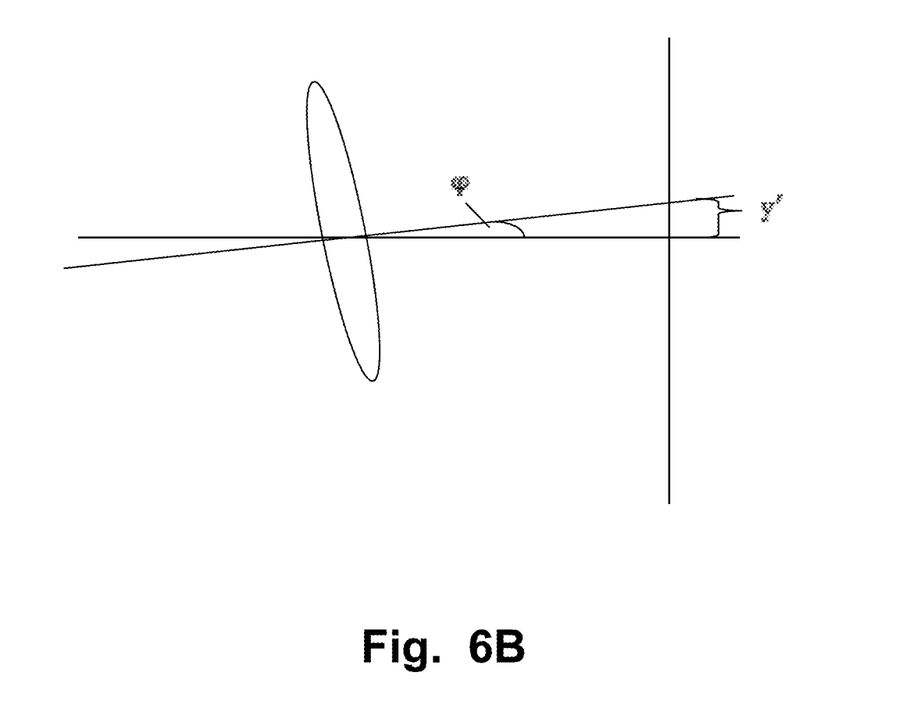
FIG. 6B discloses a schematic diagram of imaging when the optical lens is rotated at a certain angle according to Embodiment 2 of the invention.

FIG. 6b discloses a schematic diagram of imaging when the optical lens is rotated at a certain angle according to Embodiment 2 of the invention. As shown in FIG. 6b, different from Embodiment 1, the overlap width of adjacent area array detectors in Embodiment 2 of the invention in the first direction is a=0. Instead, a small angle φ is set between the adjacent optical lenses, the incident angle becomes (w−φ), and the image height at this time is y'. The corresponding expression is as follows:

$$y'=f\times\tan(w-\varphi);$$

Therefore, the adjacent optical lenses form a misaligned overlap on the image plane of the corresponding area array detector, and the overlapping width is y−y'.

In Embodiment 2 of the invention, by setting an angle between the optical lenses, the pixel elements of the rows or columns of the imaging images of adjacent area array detectors overlap.

The seamlessly splicing method based on the three lenses and area array detectors provided by the invention, three optical lenses are used to image the same target. A complete seamlessly image is formed by combining the staggered splicing of three area array detectors. It is a simple optical system, and there is no blind area in the splicing process.

Although the above methods are illustrated and described as a series of acts for simplicity of explanation, it is to be understood and appreciated that the methodologies are not limited by the order of the acts. As in accordance with one or more embodiments, some acts may occur in different orders and/or concurrently with other acts from those shown and described herein or not shown and described herein but would be appreciated by those skilled in the art.

As indicated in this application and claims, the words "a", "an", "an" and/or "the" are not specific to the singular and may include the plural unless the context clearly indicates an exception. In general, the terms "including" and "comprising" only suggest the inclusion of clearly identified steps and elements, and these steps and elements do not constitute an exclusive list, the method or device, they may also contain other steps or elements.

In addition, the terms "first" and "second" are used for describing purposes only, and cannot be understood as indicating or implying relative importance or implicitly specifying the quantity of the indicated technical features. Therefore, a feature defined as "first" and "second" may explicitly or implicitly include one or more of these features. In the description of the invention, unless otherwise stated, "plurality" means two or more, unless otherwise clearly defined.

In the invention, unless otherwise clearly specified and limited, the first feature being "on" or "under" the second feature may include that the first and second features are in direct contact, and may also include that the first and second features are in contact not directly but through another feature between them. Moreover, "above", "on" and "over" the first feature on the second feature include that the first feature is directly above and obliquely above the second feature, or just represents that the first feature level is higher than the second feature. "Below", "beneath" and "under" the first feature to the second feature include that the first feature is directly below and obliquely below the second feature, or just represents that the first feature level is less than the second feature.

The above-mentioned embodiments are provided for those skilled in the art to realize or use the invention, and those skilled in the art can make various modifications or changes to the above-mentioned embodiments without departing from the inventive idea of the invention. Therefore, the scope of protection of the invention is not limited by the above-mentioned embodiments, but should be the maximum range that conforms to the innovative features mentioned in the claims.

The invention claimed is:

1. A seamlessly splicing method based on three lenses and area array detectors, comprising:
    imaging a field of view simultaneously using the three lenses;
    arranging three area array detectors at corresponding focal plane positions of each of the three lenses to obtain imaging images, respectively;
    generating a complete seamlessly imaging result of the field of view by pairwise splicing the imaging images obtained from adjacent area array detectors, through staggered splicing of the three lenses and/or the area array detectors,
    wherein row or column pixel elements of the imaging images of the adjacent area array detectors are overlapped by an overlapping width of not less than one pixel,
    wherein each area array detector comprises a plurality of area array detection units arranged in a checkerboard pattern having a predetermined spacing, wherein, a total number of area array detection units in each area array detector is m×n; where m is a number of area array detection unit in each row and n is a number of area array detection unit in each column,
    wherein adjacent lenses are arranged at an angle in horizontal direction that is parallel to corresponding area array detectors; and the imaging images of the adjacent area array detectors are pairwise spliced by splicing lens field of view, so that the row or column pixel elements of the adjacent area array detectors are overlapped,
    wherein the adjacent lenses form a misaligned overlapping on an image plane of the corresponding area array detector, and a misaligned overlap width is a difference in image height formed by the adjacent lenses.

2. The method of claim 1, wherein the three lenses are arranged in parallel, along a first direction; and the adjacent area array detectors are translated by a specific distance to realize the overlapping of the row or column pixel elements of the adjacent area array detectors.

3. The method of claim 2, wherein a row direction of each area array detector is the first direction;
    the adjacent area array detectors are translated by L−a to achieve the pairwise splicing of the imaging images;
    wherein, L is a spacing between adjacent area array detection units in the first direction, and a is the overlapping width of adjacent area array detectors in the first direction.

4. The method of claim 1, wherein each of the area array detection units comprises a plurality of pixels arranged in a matrix, and a total number of pixels is M×N;
    where M is the number of pixel in each row, and N is the number of pixel in each column.

5. The method of claim 1, wherein, for a lens without a rotating angle, the image height is represented by y=f'×tan w, where w is an incident angle of parallel light, y is the image height, and f' is a focal length of the lens.

6. The method of claim 1, wherein, for the adjacent lenses arranged at the angle in the horizontal direction of the corresponding area array detector, the image height is represented by $y'=f'\times\tan(w-\varphi)$, where w is an incident angle of parallel light, $\varphi$ is the angle, y' is the image height, and f' is a focal length of the lens.

* * * * *